United States Patent
Tronnier et al.

(10) Patent No.: US 10,220,514 B2
(45) Date of Patent: Mar. 5, 2019

(54) OVERRIDE-BASED, PREDICTIVE SPEED CAPPING

(71) Applicant: KUKA Roboter GmbH, Augsburg (DE)

(72) Inventors: Holger Tronnier, Augsburg (DE); Günther Wiedemann, Gersthofen (DE); Stefan Burkhart, Dillingen a. d. Donau (DE); Andreas Aurnhammer, München (DE); Manfred Hüttenhofer, Meitingen (DE)

(73) Assignee: KUKA Roboter GmbH, Augsburg (DE)

( * ) Notice: Subject to any disclaimer, the term of this patent is extended or adjusted under 35 U.S.C. 154(b) by 365 days.

(21) Appl. No.: 14/962,760

(22) Filed: Dec. 8, 2015

(65) Prior Publication Data
US 2016/0176050 A1  Jun. 23, 2016

(30) Foreign Application Priority Data

Dec. 23, 2014  (DE) .................. 10 2014 226 914

(51) Int. Cl.
*B25J 9/16* (2006.01)

(52) U.S. Cl.
CPC .......... *B25J 9/1671* (2013.01); *B25J 9/1676* (2013.01); *G05B 2219/39097* (2013.01); *G05B 2219/39098* (2013.01); *G05B 2219/40475* (2013.01); *Y10S 901/02* (2013.01); *Y10S 901/16* (2013.01); *Y10S 901/28* (2013.01)

(58) Field of Classification Search
CPC ...... B25J 9/1676; B25J 9/1671; B25J 9/1666; G05B 2219/39098

USPC ......................................... 700/255
See application file for complete search history.

(56) References Cited

U.S. PATENT DOCUMENTS

| 6,678,582 | B2 | 1/2004 | Waled |
| 7,664,570 | B2 | 2/2010 | Suita et al. |
| 8,583,285 | B2 | 11/2013 | Aurnhammer et al. |
| 2010/0292843 | A1 | 11/2010 | Kariyazaki et al. |
| 2011/0224826 | A1* | 9/2011 | Maehara ............ B25J 9/1676 700/255 |

FOREIGN PATENT DOCUMENTS

| DE | 10361132 | 1/2005 |
| DE | 102008021671 | 11/2009 |
| KR | 1994-0010617 | 10/1994 |

OTHER PUBLICATIONS

The English translation of the Korean Office Action, dated Jun. 14, 2017, in the related Korean Patent Appl. No. 10-2015-0183153.
Examination Report from GPTO in DE Appl. No. 10 2014 226 914.8, dated Jul. 28, 2015.
The European Search Report from EPO in related European Appl. No. 15195595.2, dated Jun. 1, 2016.

* cited by examiner

*Primary Examiner* — Timothy R Waggoner

(57) ABSTRACT

A method for controlling a manipulator, with the method being particularly suitable for the respecting of predetermined monitoring limits. The method operates by initiating a halting movement or a speed capping based on an identified actual override trend, and is thus suitable, in particular, for path movements by means of spline interpolation.

18 Claims, 1 Drawing Sheet

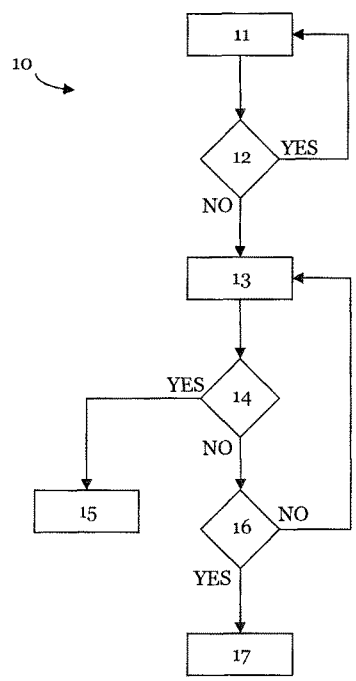

OVERRIDE-BASED, PREDICTIVE SPEED CAPPING

This application claims the benefit of priority under 35 § 119(a) to German Patent Application No. 10 2014 226 914.8, filed on Dec. 23, 2014.

1. TECHNICAL FIELD

The present invention relates to a method for controlling a manipulator, in particular in order to ensure that predetermined monitoring limits are respected.

2. TECHNICAL BACKGROUND

Robots, and in particular industrial robots, are freely programmable, program-controlled manipulation devices. The actual robot mechanics is referred to as a manipulator. This can consist of a number of moveable, interconnected links or axes, which define the kinematic chain of the robot. The kinematic chain usually extends from the foot of the robot to the flange of the robot, or, if provided, to a tool connected to the flange.

The movement of the individual axes of a robot can take place by means of a targeted control of drives, which are connected to the individual components of the manipulator. For a movement between individual points, it is possible to predetermine, during the programming of a robot program, certain parameters such as the speed, for example.

In operation, a user can control a robot via an operating system and can set operating parameters. In particular, different operating modes can be set, such as, for example, the operating modes defined according to the safety standard EN ISO 10218-1:2006 "manually reduced speed", in which a maximum speed of the robot flange and of the tool center point or tool working point (TCP) is limited to 250 mm/s, "manual high speed" or "automatic", in which speeds in accordance with the programming can be travelled.

In order to ensure that in the operating mode "manually reduced speed", for example, the flange and the TCP do not move faster than 250 mm/s, appropriate monitoring modules are implemented in the robot controller, which can trigger a suitable stop in the event that a speed limit is violated. Generally, a safety controller monitors various actual values, such as the speed of the flange, for example. If a corresponding limit is exceeded, the safety controller responds in accordance with its specifications.

In addition to the speed limits for the flange and TCP, axis-specific limits are also often defined, such as maximum axis speeds, for example. In particular in the operating mode "manually reduced speed", a maximum axis speed is advantageous in order to protect people who may share a working space with a robot during this operating mode.

A frequent violation of monitoring limits and intervention of the safety controller can significantly compromise the operability of a robot. To prevent this, it is known from an internal method to control the robot by means of intervention in the override control, or by means of implicit control of the override value. The override itself describes a derivation of the time scale between real time and system time. For example, with a program override value of 75%, a planned path with a programmed speed of 200 mm/s would be travelled only at 150 mm/s.

In the internal method, advantage is taken of the fact that the signals between the controller and the drives are smoothed by means of a so-called axis filter. Controlling of the override value in the robot controller may result in short periods of excessive speed, which can advantageously be sufficiently smoothed by the axis filter, however, such that no monitoring limits are exceeded.

The known methods are not, however, adequate for keeping all monitoring limits clean at all times while at the same time allowing a high level of robot operability or movability. In particular, if a path movement is executed by means of a spline interpolation, in order to travel along complex space curves in a highly accurate manner, the above-described method cannot be used, since no axis filters are used in a path movement by means of spline interpolation in order to advantageously allow a precise and true travel of the robot or tool.

The objective of the present invention is therefore to provide a method which permits appropriate speed capping, in particular for a path movement by means of spline interpolation. A further objective of the present invention is to provide a method which ensures precise respecting of monitoring limits.

This and additional objectives, which will become apparent from the following detailed description, are achieved by the subject matter of the independent claims.

3. CONTENT OF THE INVENTION

The invention comprises a method for controlling a manipulator, and in particular for controlling a jointed-arm robot. The manipulator is preferably controlled on the basis of a path plan and various parameters, such as a nominal override value, for example. The method according to the invention comprises a simulation, in a current cycle $t_o$, of a halting movement of the manipulator for at least one cycle $t_n$ following the current cycle. The at least one cycle $t_n$ following the current cycle must not immediately follow the current cycle $t_o$. The current cycle $t_o$ is to be understood as being a first cycle, which comes before the at least one following cycle $t_n$ chronologically.

The term "simulation" is non-restrictive, and describes a calculation or prediction of a halting movement of the manipulator, preferably based on a current state, or an actual state of the manipulator, and a path plan. The term "halting movement" describes that the manipulator is brought to a halt, i.e. is stopped or is to be stopped. The term "cycle" refers to an interval of time, and can comprise, for example, a cycle time. With a cycle time, a chronological sequence is divided up into discrete values having the same chronological interval. Preferably, the cycle or the cycle time is a so-called interpolation cycle (IPO cycle) which, depending on the components used in a control unit of the robot system, is freely selectable within a wide range, for example, between 100 μs and 12 ms.

The method according to the invention additionally comprises a determination of whether, during the simulated halting movement of the manipulator for the at least one following cycle $t_n$, a predetermined monitoring limit is violated and, in response to the determination, an initiation of the halting movement of the manipulator. It is thus checked whether, during the simulated halting movement, at least one predetermined or predefined monitoring limit is respected. The person skilled in the art will understand that a predetermined monitoring limit can be defined in an application-specific and/or device-specific manner. If such a monitoring limit is violated in the simulation, a halting of the manipulator is initiated. The method according to the invention thus allows a halting movement of the manipulator to be initiated in a timely manner if it is determined that, in a subsequent initiation of the halting movement, a monitoring limit would be exceeded. It is thus advantageously possible to prevent the simulated limit violation from actually taking place. It is evident to the person skilled in the art that the distance that the manipulator travels from the initiation of the halting movement up until the final standstill depends on the dimensions, the weight and other characteristics of the manipulator and that this can be sizeable in some cases. In the case of medium-weight industrial robots, for example, after the initiation of the halting movement up until the final standstill, 90° axis pivoting can still occur.

The halting movement preferably takes place by means of braking, and more preferably by means of adjusting a nominal speed to zero and/or by means of adjusting a nominal override value to zero. These features can be taken into account both in the step of simulation of the halting movement and in the step of initiation of the halting movement. The person skilled in the art will understand that the nominal speed can be a parameter predetermined for the robot controller, which may not be able to be implemented in a cycle, since joint drives, for example, cannot apply the forces and torque it requires. By step-wise adaptation of the actual speed to the (adjusted-to-zero) nominal speed, the halting movement can thus take place in a material-friendly manner. In particular, the person skilled in the art will understand that the speed can comprise a path speed of the manipulator. Similarly, a predetermined nominal override value may be not immediately implemented or not implemented in a single cycle. The person skilled in the art is therefore aware that an actual override value can be adapted step-wise to a nominal override value, in particular if the latter is adjusted to zero. By means of such a halting movement, a so-called speed capping is thus obtained. The method according to the invention thus advantageously allows such a halting or stopping of a manipulator to be simulated or predicted. If monitoring limits are exceeded in such a simulation, actual exceeding of the limit can advantageously be prevented by means of initiation of a halting movement.

The simulation of the halting movement preferably takes place at the beginning of the current cycle $t_o$. A cycle has a specific duration, so that the simulation can take place at different times during the cycle. Advantageously, however, this takes place early on and, in particular, as early as possible, within the cycle or even right at the beginning of the cycle. It is thus ensured that during the cycle after the simulation, sufficient time effectively remains to respond to a violation of a monitoring limit potentially detected in the simulation, so that an actual violation is in fact prevented.

The initiation of the halting movement preferably takes place in response to the determination in the current cycle $t_o$. A determined violation of a monitoring limit is thus responded to as early as in the current cycle $t_o$. The initiation of a halting movement in the current cycle $t_o$ is advantageous since no monitoring limits are violated during this movement. Otherwise, such a violation would have already been detected during a simulation in a preceding cycle, whereupon the halting movement would have already been initiated in the preceding cycle. It is then checked, using the method according to the invention, whether a halting movement initiated in the future can take place without difficulties (i.e. without violating monitoring limits). If this is not the case, the halting movement is preferably initiated immediately. The unproblematic realization of this immediately initiated halting movement has already been checked in the past (i.e. in a preceding cycle). Limit violations, which can be brought about by halting movements, can thus in fact be advantageously prevented.

The simulation of the halting movement preferably comprises a simulation of the initiation of the halting movement for a cycle $t_1$ immediately following the current cycle. The simulation thus comprises a simulation of a halting movement, which is initiated in the immediately following cycle $t_1$. It is thus possible to check whether the initiation of a halting movement in the immediately following cycle is still permissible, or whether this will already lead to exceeding of monitoring limits. In the latter case, an appropriate response is provided, in that the halting movement of the manipulator is preferably initiated immediately in cycle $t_o$.

The simulation of the halting movement for at least one cycle $t_n$ following the current cycle preferably takes place based on the simulated initiation of the halting movement for the cycle $t_1$ immediately following the current cycle. Thus the simulation of the halting movement for the fifth-next cycle $t_5$, for example, is based on the assumption that the halting movement is initiated in the immediately following cycle $t_1$. If, however, a violation of a monitoring limit was detected for this fifth-next cycle $t_5$ based on the simulation, a halting movement which is initiated in the immediately following cycle $t_1$ is thus not permissible and must advantageously be initiated in the current cycle $t_o$, in order to guarantee reliable respecting of monitoring limits.

The simulation preferably takes place based at least on a current pose of the manipulator and/or a path plan. The prediction or simulation of the halting movement can also advantageously be based on other states of the manipulator, of the robot system, as well as the surrounding environment. This permits a reliable operation of the manipulator.

The predetermined monitoring limit preferably comprises at least one of the following: a predetermined working space limit, with the working space limit more preferably being defined in Cartesian or axis-specific coordinates, a predetermined maximum axis speed for at least one axis of the manipulator, a predetermined maximum tool speed, and/or a predetermined maximum flange speed or a predetermined maximum tool center point speed. The person skilled in the art will understand that a manipulator can be monitored and controlled on the basis of various monitoring limits or monitoring criteria. In particular, the monitoring limits can be set with reference to an operating mode. Depending on the use and the design of the manipulator, the person skilled in the art can select suitable monitoring limits and thus predetermine them for the method according to the invention. This means that, for example, critical elements of the robot kinematics (such as the speed of the joint positions, for example) can be limited. In addition, the speeds of several alternative TCPs, for example, can be suitably limited. In addition, the method according to the invention also allows limitation of values based on higher axis derivations (such as axis acceleration, for example) and variables derivable therefrom (such as motor torques and drive torques, for example) and prevention of any exceeding of such values.

The simulation of the halting movement preferably comprises a calculation of a speed of the manipulator and/or a calculation of an actual override value and/or a calculation of an actual state of the manipulator for the at least one cycle $t_n$ following the current cycle. From the trend of these values, robot poses, for example, can be predicted in an exact Cartesian and axis-specific manner up until the stop of the manipulator (i.e. up until the actual override value of zero is reached). From this position trend, all relevant monitoring variables can be easily and precisely predicted up until the stop of the manipulator.

The simulation of the halting movement of the manipulator is preferably carried out for every cycle $t_n$ following the current cycle up until a simulated standstill of the manipulator. The halting movement is thus simulated for all cycles $t_n$ in which the manipulator has not yet come to a standstill, i.e. there is an actual override value greater than zero, for example. However, the simulation is preferably ended in the event of detection of a violation of a monitoring limit. The halting movement of the manipulator can thus be directly initiated in an efficient manner.

The method according to the invention preferably also comprises, preferably before the simulation of the halting movement, an identification, at the beginning of the current cycle, of an actual state of the manipulator for the current cycle, based at least on a nominal speed for the current cycle. In addition, the method according to the invention preferably comprises a determination of whether, based on the identified actual state of the manipulator, a predetermined monitoring limit is violated, and a reduction in response to the determination of the nominal speed for the current cycle. It is thus checked whether, based on the nominal speed, which is available to the robot controller, for example, a monitoring limit is violated in the current cycle. The nominal speed can preferably comprise a nominal override. Through a reduction of the nominal speed for the current cycle, such an exceeding of a monitoring limit can thus be prevented.

An initiation of a halting movement on the basis of the determination is not required, since the permissibility of a movement during the current cycle was already checked in accordance with the method according to the invention in a preceding cycle. It is thus advantageously ensured that no monitoring limits are violated during the current cycle and that the initiation of a halting movement in the immediately following cycle would not result in any impermissible violations of monitoring limits.

It is also preferable that the actual state of the manipulator comprises Cartesian and axis-specific manipulator positions and/or manipulator movement data. The person skilled in the art will understand that the actual state reflects not only static information about the manipulator, but also comprises dynamic characteristics. In particular, on the basis of the actual state, a monitoring of all relevant monitoring variables can thus take place.

It is also preferable that the identification of the actual state of the manipulator for the current cycle also takes place based on a current pose of the manipulator and/or a path plan. A precise prediction about the states of the robot can thus be made during the current cycle.

A robot system according to the invention comprises a manipulator, and in particular a jointed-arm robot, as well as a control system. The latter is configured to execute the method according to the invention for controlling a manipulator.

By means of the method according to the invention, all monitoring limits can be reliably respected at all times, with the capping, or initiation of a halting movement coming as close as possible to the monitoring limits. The method according to the invention and, in particular, the robot system according to the invention is also suitable, due to the forecast or prediction for the current cycle and/or for following cycles, for safe and precise movement by means of spline interpolation.

4. EXEMPLARY EMBODIMENTS

The present invention is described in greater detail below with reference to the accompanying figure, in which:

FIG. 1 shows a schematic representation of the sequence of a method according to the invention for controlling a manipulator.

FIG. 1 is a schematic and exemplary depiction of the sequence of a method 10 according to the invention for controlling a manipulator. The depicted processes preferably take place at the beginning of a current cycle, hereafter referred to as cycle $t_o$.

The method 10 begins in step 11, wherein, in cycle $t_o$, a new actual override value is identified, which results from a predetermined nominal override value. Alternatively, it is also possible to identify what actual path speed would result based on a predetermined nominal path speed. Based on the identified actual override value, Cartesian and axis-specific robot positions and all relevant, i.e. to be monitored, derivations of this position data are identified for the cycle $t_o$.

In the following step 12, it is determined or checked whether, on the basis of the values identified in step 11, a monitoring variable would already be violated during the cycle $t_o$. If this decision 12 is affirmative, the nominal override value, or alternatively the nominal path speed, is reduced, and then the method is continued in step 11 with the reduced nominal override value or the reduced nominal path speed. This sequence is repeated until a critical (maximum) actual override value has been identified, with which no monitoring variables in the cycle $t_o$ would be violated, so that the decision 12 is negative.

If the decision 12 is negative, in step 13 an actual override value for the following cycle $t_i = t_1$ is simulated. In other words, there is simulation of what would happen if a halting movement were to be initiated in cycle $t_1$, i.e. if the nominal override were to be adjusted to zero in cycle $t_1$. For the actual override value, Cartesian and axis-specific data of the manipulator are determined for the cycle $t_1$. From these simulated positions, the derivations to be monitored, such as the flange speed, for example, are identified. In the course of the simulation of this halting movement initiated in cycle $t_1$, the controller calculates the path of the manipulator or of the TCP for all following cycles $t_2$ up until $t_{standstill}$. If this simulated path were to lead to a limit violation, the simulation ends and the halting movement is immediately initiated in cycle $t_o$. This sequence is represented as follows in FIG. 1 by way of an example:

In the decision 14, it is determined or checked whether, based on the variables identified in step 13, at least one relevant monitoring limit would already be exceeded in cycle $t_1$. If this decision 14 is affirmative, in step 15 the simulation is ended in the current cycle $t_o$ and the nominal override value for the current cycle $t_o$ is immediately adjusted to zero, i.e. a halting movement is initiated. Alternatively, a nominal path speed can also be adjusted to zero. The reliability of the actual override values resulting from the following cycles was already guaranteed during the preceding cycle $t_{-1}$.

If, however, the decision 14 is negative, it is checked in a following decision 16 whether the actual override value identified for the simulation cycle $t_1$ is zero, i.e. whether the manipulator has come to a standstill at cycle $t_1$ in the simulation. If this is not the case, the cycle time to be simulated is increased by one ($t_{i=i+1}$) and the method is continued in step 13 for this next cycle. In other words, there is simulation for cycle $t_2$ of where the manipulator or the TCP is located, based on the halting movement (simulatedly) initiated in cycle $t_1$. In the decision 14, it is then checked whether a monitoring limit would be violated in the cycle $t_2$. If this is the case, in accordance with step 15, the simulation is ended and the nominal override value for the current cycle $t_o$ is immediately adjusted to zero, i.e. a halting movement is initiated. Otherwise, in decision 16, it is checked whether the actual override value identified for the simulation cycle $t_2$ is already zero, i.e. whether the manipulator has come to a standstill at cycle $t_2$ in the simulation. If this is not the case, the cycle time to be simulated is again increased by one ($t_{i=i+1}$), and the method is simulated in step 13 for the cycle $t_3$, etc.

If the decision 16 is affirmative, i.e. the manipulator came to a stop in the simulation for, for example, the cycle $t_{15}$, in the following step 17 the simulation is ended in the current cycle $t_o$, and the maximum actual override value previously identified in the steps 11, 12 is used as the real actual override value for the current cycle $t_o$ and the manipulator is controlled based on this value.

The method then starts anew in the next cycle $t_1$, which then corresponds to the current cycle.

It should be noted that the invention claimed herein is not limited to the described embodiments, but may be otherwise variously embodied within the scope of the claims listed infra.

The invention claimed is:

1. A method for controlling a manipulator, comprising:
  simulating in a current cycle ($t_0$) a path movement of the manipulator under control of an override value;
  identifying a critical override value at which a maximum path speed of the manipulator can be achieved without violating a predetermined monitoring limit;
  simulating in the current cycle ($t_0$) a halting movement of the manipulator performed over a sequence of cycles ($t_1 \ldots t_n$) following the current cycle, the halting movement reducing the path speed from an actual simulated path speed at the critical override value to a standstill over the sequence of cycles ($t_1 \ldots t_n$);
  determining during the simulated halting movement of the manipulator and successively in ones of the sequence of cycles ($t_1 \ldots t_n$) whether the predetermined monitoring limit is violated; and
  initiating the halting movement of the manipulator during the current cycle ($t_0$) upon determining that the predetermined monitoring limit is violated during one of the sequence of cycles ($t_1 \ldots t_n$),
  wherein the cycle ($t_1$) immediately follows the current cycle ($t_0$).

2. The method according to claim 1, wherein the halting movement takes place by means of braking.

3. The method according to claim 1, wherein the simulation of the halting movement takes place at the beginning of the current cycle ($t_0$).

4. The method according to claim 1, wherein the initiation of the halting movement takes place in response to determining in the current cycle ($t_0$) that the predetermined monitoring limit is violated.

5. The method according to claim 1, wherein the simulation of the halting movement for the sequence of cycles ($t_1 \ldots t_n$) following the current cycle takes place based on the simulated initiation of the halting movement for the cycle ($t_1$) immediately following the current cycle.

6. The method according to claim 1, wherein the simulation takes place based at least on a current pose of the manipulator or a path plan.

7. The method according to claim 1, wherein the predetermined monitoring limit includes one or more members selected from the group consisting of:
  a predetermined working space limit defined in Cartesian or axis-specific coordinates,
  a predetermined maximum axis speed for at least one axis of the manipulator,
  a predetermined maximum tool speed,
  a predetermined maximum flange speed, and
  a predetermined maximum tool working point speed.

8. The method according to claim 1, wherein the simulation of the halting movement comprises at least one of a calculation of a speed of the manipulator or a calculation of an actual override value or a calculation of an actual state of the manipulator for the sequence of cycles ($t_1 \ldots t_n$) following the current cycle.

9. The method according to claim 1, wherein the step of identifying a critical override value further comprises the steps of:
  identifying, at the beginning of the current cycle, an actual state of the manipulator for the current cycle, based at least on a nominal speed for the current cycle;
  determining whether, based on the identified actual state of the manipulator, a predetermined monitoring limit will be violated in the current cycle, and
  reducing, in response to the determination, of the nominal speed for the current cycle.

10. The method according to claim 9, wherein the actual state of the manipulator comprises at least one of Cartesian and axis-specific manipulator positions or manipulator movement data.

11. The method according to claim 9, wherein the identification of the actual state of the manipulator for the current cycle is also based on at least one of a current pose of the manipulator or a path plan.

12. The method according to Claim 1 wherein, in the simulating step, the path speed is step-wise adapted from the speed at the critical override value to a standstill over the sequence of cycles ($t_1 \ldots t_n$).

13. A robot system, comprising:
  a manipulator; and
  a control system,
  wherein the control system is configured to:
    simulate in a current cycle ($t_0$) a path movement of the manipulator under control of an override value,
    identify a critical override value at which a maximum path speed of the manipulator can be achieved without violating a predetermined monitoring limit,
    simulate in the current cycle ($t_0$) a halting movement of the manipulator performed over a sequence of cycles ($t_1 \ldots t_n$) following the current cycle, the halting movement reducing an actual simulated path speed from a speed at the critical override value to a standstill over the sequence of cycles ($t_1 \ldots t_n$),
    determine during the simulated halting movement of the manipulator and successively in of ones of the sequence of cycles ($t_1 \ldots t_n$) whether the predetermined monitoring limit is violated, and
    initiate the halting movement of the manipulator during the current cycle ($t_0$) upon determining that the predetermined monitoring limit is violated during one of the sequence of cycles ($t_1 \ldots t_n$),
  wherein the cycle ($t_1$) immediately follows the current cycle($t_0$).

14. The method according to claim 1, wherein the manipulator comprises a jointed-arm robot.

15. The method according to claim 2, wherein the halting movement takes place by means of adjusting a nominal speed to zero or by means of adjusting a nominal override value to zero.

16. The system according to claim 13, wherein the manipulator comprises a jointed-arm robot.

17. The system according to claim 13, wherein the predetermined monitoring limit includes one or more members selected from the group consisting of:
- a predetermined working space limit defined in Cartesian or axis-specific coordinates,
- a predetermined maximum axis speed for at least one axis of the manipulator,
- a predetermined maximum tool speed,
- a predetermined maximum flange speed, and
- a predetermined maximum tool working point speed.

18. The system according to claim 13, wherein the control system configured to simulate the halting movement in a step-wise adaptation of the path speed is step-wise adapted from the speed at the critical override value to a standstill over the sequence of cycles ($t_1 \ldots t_n$).

* * * * *